Oct. 10, 1944.     R. O. HAMILL     2,360,223
MAXIMUM DEMAND THERMAL ELECTRIC METER
Filed July 8, 1943     3 Sheets-Sheet 1

R. O. Hamill  INVENTOR

BY Thomas Howe  ATTORNEY

Oct. 10, 1944. R. O. HAMILL 2,360,223
MAXIMUM DEMAND THERMAL ELECTRIC METER
Filed July 8, 1943 3 Sheets-Sheet 2

INVENTOR
R. O. Hamill
BY
Thomas Howe
ATTORNEY.

Oct. 10, 1944.   R. O. HAMILL   2,360,223
MAXIMUM DEMAND THERMAL ELECTRIC METER
Filed July 8, 1943   3 Sheets-Sheet 3
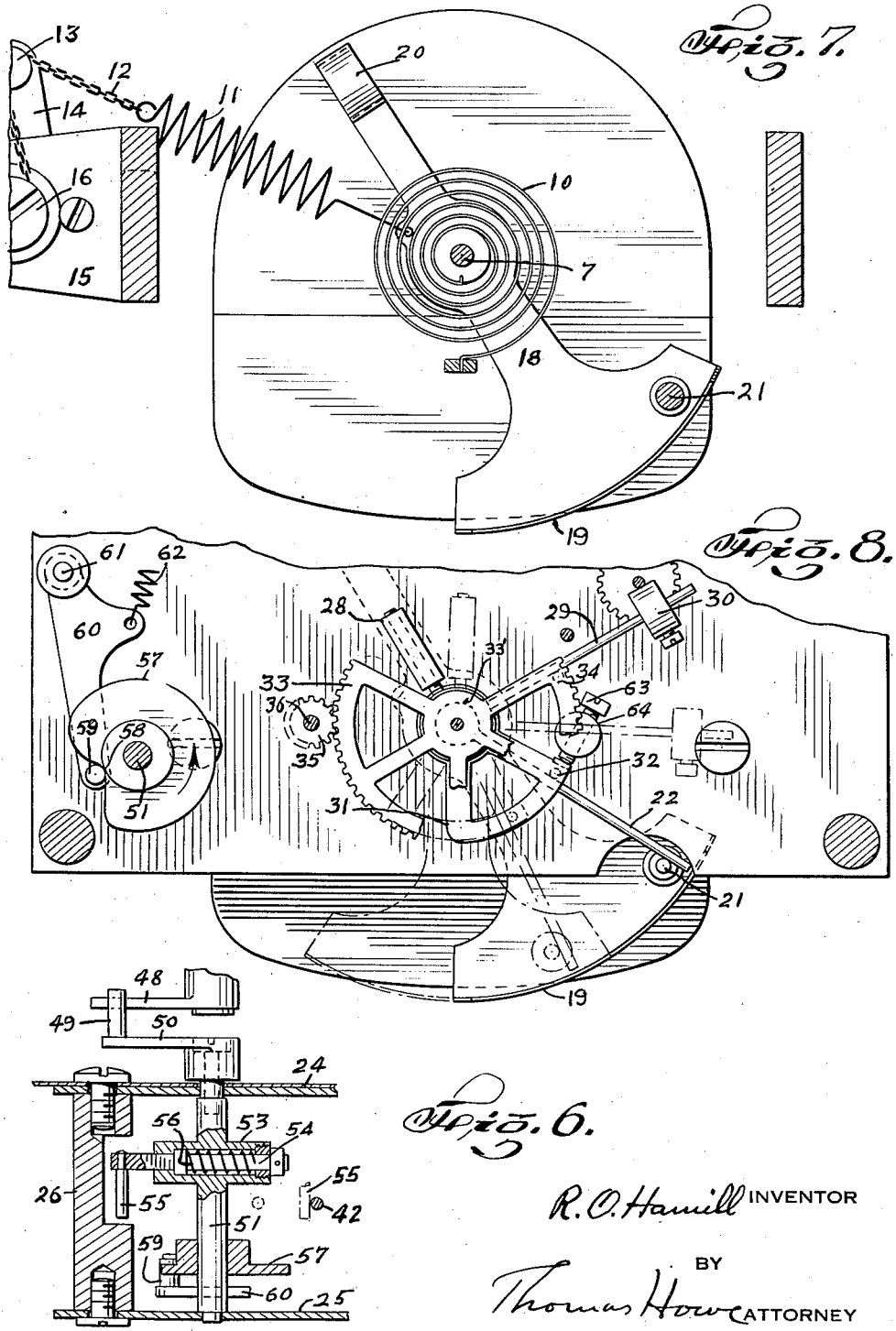
R. O. Hamill INVENTOR
BY Thomas How ATTORNEY Patented Oct. 10, 1944

2,360,223

UNITED STATES PATENT OFFICE 2,360,223

MAXIMUM DEMAND THERMAL ELECTRIC METER

Ret O. Hamill, Elmhurst, N. Y.

Application July 8, 1943, Serial No. 493,808

11 Claims. (Cl. 171—34)

This invention relates to electric meters for furnishing information regarding the maximum load demand by the consumer.

Such devices have been used, both as to maximum demand indicating means and registers cumulating maximum demands, in connection with motor operated meters and thermally operated meters for indicating the maximum demand, have been employed. The peculiarities of thermally operated meters, however, have prevented the use of cumulating maximum demand registers in such meters.

It is the main object of the present invention to provide a thermally operated maximum demand meter with a cumulating maximum demand register.

The invention, however, involves meter mechanism which is applicable to other than thermally operated meters.

It is a further object of the invention to provide improved mechanism for operating the indicating means of a maximum demand meter.

It is a further object of the invention to provide improved mechanism for operating the cumulating maximum demand register of a maximum demand meter.

It is a further object of the invention to provide improved mechanism for operating both the indicating means and the cumulating maximum demand register of a maximum demand meter.

Other and ancillary objects of the invention will appear hereinafter.

In the accompanying drawings which illustrate the invention—

Fig. 6 is a fragmentary view being a section on the line 6—6 of Fig. 3;

Fig. 7 is a section, on an enlarged scale, on the line 7—7 of Fig. 2;

Fig. 8 is a section, on an enlarged scale, and partly broken away, on the line 8—8 of Fig. 2.

Figure 1:
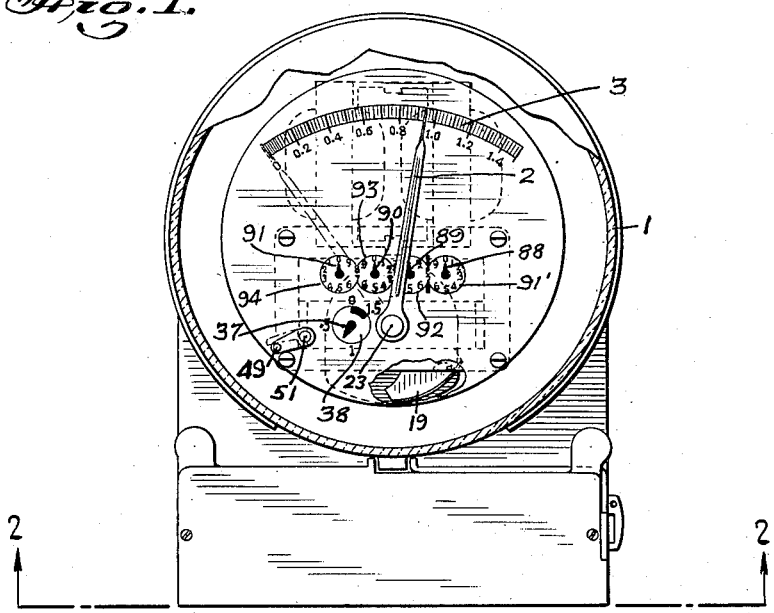
Fig. 1 is a front elevation of a maximum demand watt meter embodying the invention, partly broken away and partly in section.
Figure 2:
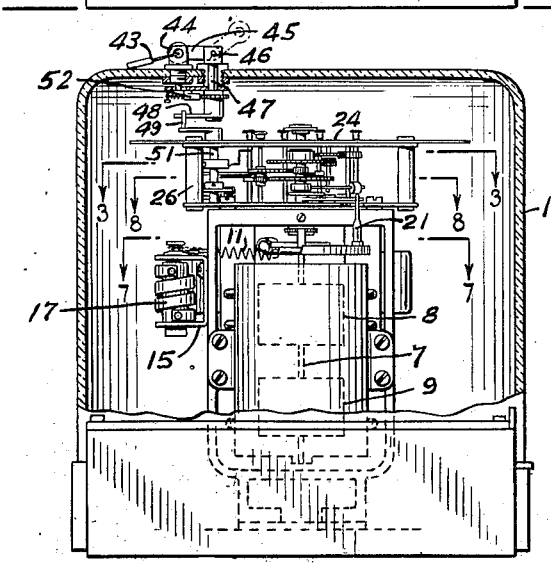
Fig. 2 is a bottom plan view viewed from the line 2—2 of Fig. 1, the casing being partly broken away to show the interior of the apparatus.

Referring to the drawings there is therein shown a cumulative maximum demand thermal watt meter. The apparatus comprises a casing 1, a maximum demand hand or pointer 2 moving over a scale 3, cumulative maximum demand register dials 91', 92, 93, and 94, a test dial 38 and a handle 45 for resetting the maximum demand pointer, and actuating the pointers of the cumulative demand dials and the test dial. Of course a suitable window is provided in the front of the casing through which the indicating pointer and recording registers may be viewed and the handle 45 is outside on the front of the casing where it can be readily operated by the operator.

The apparatus comprises a rotatably mounted shaft 7, turned in one direction or the other by the rise or fall of the load demand, which is acted upon by spirally coiled bimetallic thermal elements 8 and 9 which are affected by heat generated by current in relation to which the indication and registration is to be made. The turning of the shaft by the action of the load on the thermal elements is opposed by a coiled spring 10 having its outer end fixed to the frame and its inner end secured to the shaft 7 and the spring 10 is opposed by a calibrating spring 11 secured at one end to a chain 12 passing about a post 13 in an arm 14 pivoted in the bracket 15 and at its other end to a member 18 fixed on the shaft 7.

The end of the chain 12 after passing about the post 13 has its ends secured to the pin 16 rotatably mounted in the bracket 15 which pin may be turned in one direction or the other by a screw-driver to take up or pay out the chain 12, thereby to increase or decrease the tension on the spring 11 to adjust the deflection of the instrument. Compensation for the ambient temperature is provided by means of a bimetallic helix 17 to the upper end of which is fixed the arm 14, the lower end of the helix 17 being secured to the bracket 15. All of the foregoing electro-thermally operated means for operating the shaft 7 is a well known and well understood construction in connection with electro-thermally operated indicating maximum demand meters and such a meter having its shaft operated by thermal elements acted on by the load is shown and described in the description and illustration of the Westinghouse type R. H. Demand Meter on pages 919 to 924 inclusive of the Handbook for Electrical Meter Men, fourth edition, published in 1923 under the direction of the meter committee of the National Electric Light Association, 29 West 39th Street, New York, N. Y., and copyrighted in 1924 by the National Electric Light Association.

Upon the shaft 7 is fixed an arm 18 having a segmental portion 19 at one end and a counter-balancing weight 20 at the other.

Fixed in the segment 19 is a pin 21 against which is urged a rod 22 pivoted and free to swing about a shaft 23 which is pivoted in the plates 24 and 25 secured together and spaced apart by posts 26, and supported from the frame.

Rotatably mounted upon the shaft 23 is a hub 27 to which are fixed the weight 28 and the weight arm 29 upon which is the adjustable weight 30. Integrally formed with the hub 27 is a quadrant or segment 31 having a pin 32 fixed in it which is adapted to come against the upper side of the rod 22.

It will now be seen that the turning of the hub 27 by the action of the weights 28 and 30 will tend to cause the pin 32 to move the rod 22 against the pin 21 which will be moved according to the watts of the circuit in relation to which the indication and registration are to be made, the rod 22 being pressed against the pin and following it in its various positions. The weight 28 is provided in addition to the weight 30 so that after the rod 29 has reached its horizontal position and the weight 30 decreases in turning effect onwardly from that point, the weight 28 will come into operation, and add its gradually increasing turning effect to the gradually decreasing turning effect of the weight 30, so that a more uniform turning effect will be obtained throughout the range of the apparatus.

A pinion 33 has its hub 33' fixed to the shaft 23, and to this pinion is fixed a pin 34 lying in the path of the weight rod 29 so that as this rod moves downwardly under the action of the weight, the pin will be moved with it to turn the gear 33 and with it the shaft 23. To the forward end of the shaft 23 is fixed the pointer 2.

It will now be observed that the pointer 2 will be turned to take up its position according to the position to which the pin 34 is moved by the weight rod 29 and that the position of the weight rod is limited by the pin 32 which is in turn limited in position by the rod 22 which rests against and is controlled in position by the position of the pin 21 which is positioned in accordance with the demand the maximum of which is to be registered and indicated. If at any time the demand should become less and the pin 21 should be moved into a position dictated by such lower demand, the arm 22 and the weight arm 29 would be moved in a direction counter-clockwise as viewed in Fig. 8. But in such operation the arm 29 would be simply moved away from the pin 34, the pointer 2 being thus incapable of movement thereby to indicate a less demand. The pointer 2 can only be actuated by the weight arm 29 to increase the demand indicated and cannot be moved thereby in the opposite direction so that the pointer 2 always remains at the position of maximum demand.

The pointer 2 after a certain definite period, say a month, is to be reset to zero and in such backward movement the pointer will obviously move a distance equal to the distance which it moved forwardly to indicate the maximum demand. This is taken advantage of to actuate the cumulative registration of the maximum demands.

The movement of the pinion 33 by the weight 30, as described will also cause, by the meshing of the pinion 33 with another pinion 35 fixed upon the shaft 36 rotatably mounted in the plates 24 and 25, a rotation of the shaft 36 which has fixed to it the pointer 37 which will obviously be turned into the maximum demand position along with the pointer 2, the pointer 37 moving over a scale 38 on the face of the meter, this pointer 37 thus duplicating the indication of the pointer 2, will form a test or checking means for the maximum demand indication as given by the pointer 2.

Figure 3:
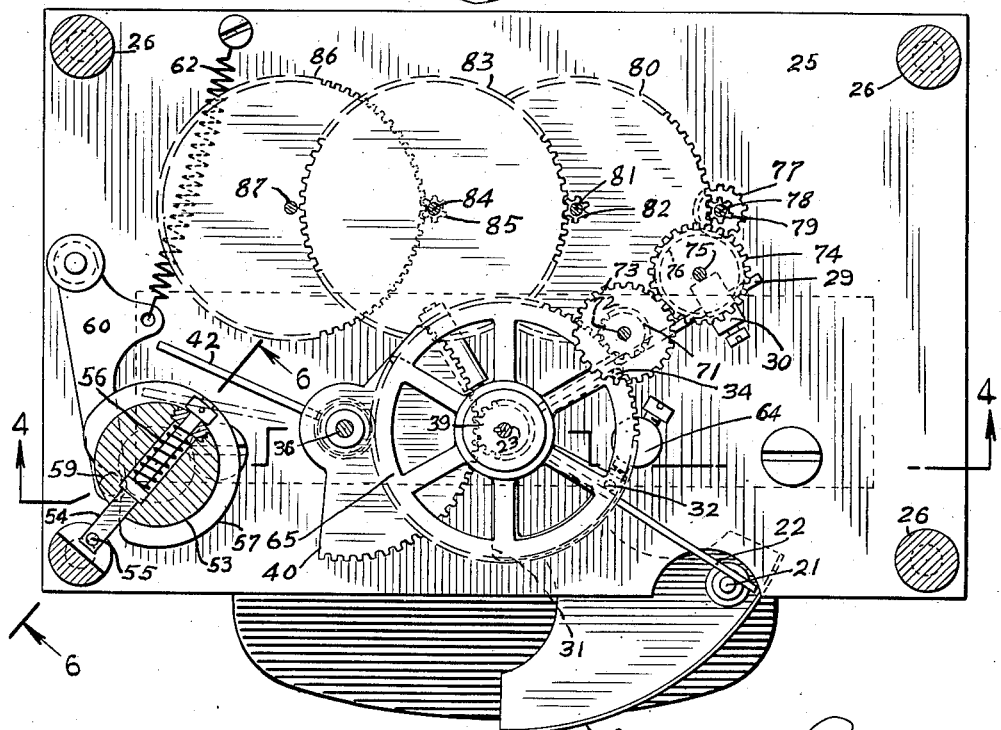
Fig. 3 is a section, on an enlarged scale, on the line 3—3 of Fig. 2.
Figure 4:
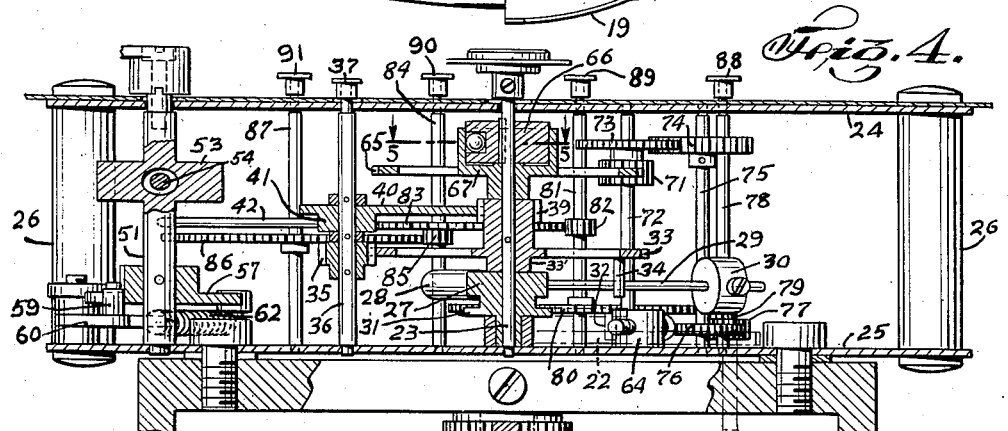
Fig. 4 is a section, partly broken away, on the line 4—4 of Fig. 3.

The turning of the shaft 23 in response to the weight 30 as described, also turns a gear 39 fixed to it and meshing with the segmental gear 40 rotating upon the shaft 36 but not fixed thereto, thereby turning the hub 41 of the gear 40 from which the rod 42 projects so that as the shaft 23 is turned in response to an increase in the demand the rod 42 is turned downwardly (Fig. 3) so that the greater the maximum demand the further down will be turned the rod 42.

The time having arrived for a resetting of the instrument, at the end of some predetermined period such, for instance, as a month, the seal on the outside of the front of the instrument comprising the wire 43 passing through holes in clips 44 and a blade 45 is broken. The blade 45 being thus freed may be moved upwardly out of the clips 44 about the pivot 46 by which the blade or handle 45 is connected with a shaft 47 rotatably mounted in the casing and having fixed to it the arm 48.

When the shaft 47 is turned by the handle or blade 45 which has been disengaged from the clip 44, the arm 48 will come against a pin 49 fixed in an arm 50 which is secured in fixed relation to the shaft 51 rotatable in the plates 24 and 25. The shaft 47 may be turned in one direction only, it being prevented from turning in the opposite direction by a pawl and ratchet 52. Integral with the shaft 51 is a casing 53 in which slides a plunger 54 having the pin 55 fixed in its outer end. A spring 56 resiliently forces the pin 55 into its outermost position.

Also fixed to the shaft is a member 57, the outer periphery of which is circular except for the depression 58 into which is spring-pressed the pin 59. The pin 59 is fixed in an arm 60 pivoted at 61 on the plate 25, a spring 62 secured at one end to the arm 60 and at the other end to the plate 25, drawing the arm 60 in a direction to resiliently force the pin 59 against the periphery of the member 57 and into the depression 58 thereof. This definitely locates the initial and final position of turning of the shaft 51. By reason of the pawl and ratchet 52 the shaft 51 can be turned in but one direction (that to reset the maximum demand indicators and operate the cumulative registers) and is only held firmly in one position, namely, that in which the pin 59 is in the bottom of the depression 58. The operator should make a complete revolution of the shaft 51 and this is done by turning the shaft 51 in the only direction permissible thereby forcing the pin 59 out of the depression 58 when it will ride upon the circular portion of the member 57 until it again comes into the depression 58 when a complete revolution has been made. Anything less than a complete revolution would impair the reliability of the meter, and a failure to make a complete revolution would be readily detectable because the shaft 51 would be readily turnable, being only definitely held in position by the location of the pin 59 in the depression 58.

The turning of the shaft 51 in a resetting revolution as referred to, will cause the pin 55 to come against the arm 42 and force it upwardly, thereby turning the segmental gear 40 meshing with the gear 39 and thereby turning the pinion 33 and with it the weight arm 29 and member 27, the member 27 being thus turned in a direction opposite to that in which it is turned by an increase in the electric demand. This turning of the member 27 will carry with it the segmental member 31, this movement being limited by the member 31 coming against adjustable stop screw 63 in the stud 64 fixed on the plate 25.

It will be observed that should the pin 55 tend to push the arm 42 beyond such position the spring 56 pushing upon the pin will give so that there can be no jamming of the apparatus.

The arm 42 having been raised to its maximum heighth as defined by the stop screw 63, the pin 55 will then gradually recede from its maximum position so that the rod 42 will gradually be permitted to return to a position as dictated by conditions of other portions of the apparatus, the rod 42 being gradually permitted to assume this position without any sudden jolts or shocks.

The rod 42 having been moved to its extreme reset position (defined by the member 31 coming against the stop screw 63) the pin 21 will remain in the position as defined by the demand at the time of resetting. As the pin 55 recedes from its position of extreme resetting of rod 42, the weights operating on the pinion 33 and the member 31 will cause the rod 22 to be advanced until it rests against the pin 21 in its position of demand at the moment and the pointers 2 and 37 will be correspondingly positioned. As the pin 55 recedes still further in the completion of the resetting revolution the pin will separate from the rod 42 and return to its initial position defined by the roller 59 lodging in the depression in the member 57, the rod 22 and mechanism controlled thereby being free to follow the demand controlled pin 21.

Figure 5:
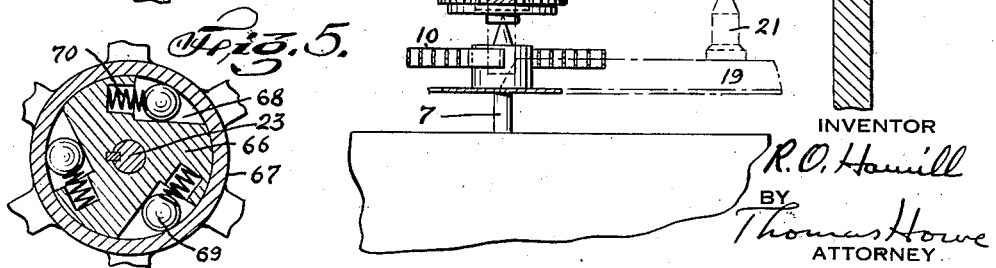
Fig. 5 is a section, on an enlarged scale, on the line 5—5 of Fig. 4.

Also in the resetting operation, which has been described, the gear segment 40 and therefore the shaft 23 will be moved in the opposite direction to that in which it is moved by the weighted member 27 in response to the demand. In this resetting movement of the shaft 23, the pinion 65 will be gripped to the shaft 23 by a one way clutch comprising the inner member 66 keyed to the shaft 23 and the outer member 67 surrounding the member 66 and fixed to the pinion 65, the member 67 and pinion 65 being freely rotatable upon the shaft 23 except that it may be frictionally driven by the one way clutch. The inner member is provided with recesses 68 wherein are located balls 69 pressed by springs 70 into wedging position between the clutch members 66 and 67 when the shaft 23 and member 66 are moved in a counter-clockwise (Fig. 5) direction but permits the member 66 to move freely with relation to the member 67 when moved in the opposite direction. This clutch is of great importance in contributing to the accuracy of the apparatus in that while the members may freely relatively turn when the shaft is turned in one direction, all motion of the member 66 in the other direction is immediately and firmly accompanied by motion of the member 67 no matter what the relative positions of the members, all lost motion between these members and consequent inaccuracy of the instrument being avoided.

In this resetting movement of the shaft 23 therefore, the pinion 65 will drive the pinion 71 with which it meshes. The pinion 71 is fixed to the shaft 72 rotatably mounted in the plates 24 and 26 on which shaft is also fixed the pinion 73 meshing with pinion 74 fixed on shaft 75 rotatably mounted in the plates 24 and 25. Fixed on the shaft 75 also is a pinion 76 which meshes with a pinion 77 fixed on the shaft 78 on which shaft, rotatably mounted in the plates 24 and 25, is also fixed a pinion 79 meshing with a pinion 80 fixed on a shaft 81 rotatable in the plates 24 and 25. To the shaft 81 is also fixed the pinion 82 meshing with the gear 83 fixed on the shaft 84 rotatably mounted in plates 24 and 25, to which shaft is also fixed the pinion 85 meshing with the pinion 86 fixed on the shaft 87 rotatably mounted in the plates 24 and 25.

Fixed to the shafts 78, 81, 84 and 87 respectively, upon the outer side of the front plate 24, are the pointers 88, 89, 90 and 91 moving respectively over the dials 91, 92, 93 and 94 indicating units, tens, hundreds and thousands respectively as is usual with such registers.

It will now appear that in the operation of the meter the pin 21 will be advanced to a position dictated by the thermal elements under the effect of the load. This pin in its movement with change in the load demand will have the rod 22 pressed against it by the pin 32 in the segment 31 which is biased by the weights 28 and 30 in that direction. The weight arm 29 is thus limited in its position by the position of the pin 21 and comes against the pin 34 whereby the shaft 23 will be turned in response to increase in the demand and will turn the pointer 2 to indicate an increase on the scale. If, however, the demand should be decreased the weight arm 29 will be simply lifted away from the pin 34 so that the pointer 2 will not be moved because of decrease in the demand. The pointer 2 will thus always remain in the position (during any given period between resettings) to indicate the maximum demand occurring during that period. During the direction of movement of the shaft 23 occasioned by increase in the demand, the clutch member 66 will move freely with relation to the clutch member 67 so that there will be no actuation of the cumulative registers. There will, however, be a driving of the segmental gear 40 carrying the arm 42 which will move the arm 42 downwardly (see Fig. 3) by a distance proportional to the maximum demand as indicated by the pointer 2. Also the pointer 37 of the test dial will be moved to a position corresponding to the maximum demand position of the pointer 2.

The end of the predetermined period, as a month, having arrived, the shaft 51 will be in the initial position wherein it is held by the spring-pressed roller 59 engaging in the depression 58 in the member 57. In this position of the shaft, the pin 55 will be retracted so as not to interfere in any way with the movement of the rod 42 under the control of the pin 21 as before described.

Upon the manual application as described of force to turn the shaft 51, the roller 59 will ride out of the depression upon the circular periphery of the member, 57 the pin 55 coming against the rod 42 and moving it with its connected mechanism to its initial position as defined by the quadrant 31 coming against the stop screw 63. This resetting movement of the rod 42 and its connecting mechanism is proportional to the maximum demand as shown for the period by the pointer 2 and consequently the shaft 23 will be moved backwardly a distance equal to the distance it has moved forwardly in response to the maximum demand. The shaft 51 will be turned to make a complete revolution, this being insured by the fact that it will be apparent to an inspector from the position of the handle 45 with relation to the clips 44 if a complete revolution has not been made. The shaft 51 can only be turned in one and the proper direction (see the arrow, Fig. 8) by reason of the fact that the operating handle is connected with the shaft through the arm and pin 48 and 49 which will separate if an attempt is made to turn the shaft 51 in the opposite direction.

In the backward turning of the shaft 23 under the resetting operation as referred to, the clutch member 66 will grip the member 67 and through the pinion 65 and connected gears as described will drive the pointers 88, 89, 90 and 91 by an amount proportional to the maximum demand as indicated by the pointer 2 whereby such maximum demand will be added to or cumulated with the sum of maximum demands of previous periods as similarly set up on the register.

In resetting the apparatus as referred to, to the position where the segment 31 comes against the stop screw 63, the arm 29 and the weights 28 and 30 will be moved to their initial positions. The pin 21, however, will take up a position corresponding to the load demand at the moment. The turning of the shaft 51 in the resetting operation having turned the arm 29 into its initial position limited by the stop screw then, on further turning of the shaft, as the pin 55 recedes from the arm 42 the arm 29 will be permitted to come gradually forward under the influence of the weights 28 and 30 until it comes into engagement with the pin 21 through pin 32 and arm 22. It will be observed that by this construction of reset the parts come gently against the pin 21 so that there is no overrunning of the position with consequent vibration and no jolting or jarring of the apparatus. Also it will be seen that the pointers 2 and 37 will take up their positions according to that of the pin 21.

While the invention has been illustrated in what is considered its best application it may have other embodiments without departing from its spirit and is not, therefore, limited to the structure shown in the drawings.

What I claim is:

1. In a maximum demand electric meter, the combination of load responsive means comprising a control member adapted to move in a forward direction with rise in the load demand and to move in a reverse direction with fall in the load demand, a maximum demand indicator, resetting means for periodically resetting said maximum demand indicator, and an energy storing weight arranged to be moved to a predetermined raised position by said resetting means in each periodic resetting operation, said weight transmitting driving force to advance said maximum demand indicator under the regulating control of said control member.

2. In a maximum demand electric meter, the combination of load responsive means comprising a control member adapted to move in a forward direction with rise in the load demand and to move in a reverse direction with fall in the load demand, a maximum demand indicator, resetting means for periodically resetting said maximum demand indicator, an energy storing weight arranged to be moved to a predetermined raised position by said resetting means in each periodic resetting operation, said weight being operative to advance said maximum indicator by the energy stored in said weight, and a one-way pusher connection between said control member and said weight whereby the degree of movement imparted from said weight to said maximum demand indicator is dependent upon the degree of forward movement of said control member.

3. In a maximum demand electric meter, the combination of load responsive means comprising a control member adapted to move in a forward direction with rise in the load demand and to move in a reverse direction with fall in the load demand, a maximum demand indicator, resetting means for periodically resetting said maximum demand indicator, an energy storing weight, and a one-way pusher connection between said resetting means and said weight whereby said weight is moved to a predetermined raised position by said resetting means in each periodic resetting operation, said weight thereafter transmitting driving force to advance said maximum demand indicator under the regulating control of said control member.

4. In a maximum demand electric meter, the combination of load responsive means comprising a control member adapted to move in a forward direction with rise in the load demand and to move in a reverse direction with fall in the load demand, a maximum demand indicator, resetting means for periodically resetting said maximum demand indicator, an energy storing weight, a one-way pusher connection between said resetting means and said weight whereby said weight is moved to a predetermined raised position by said resetting means in each periodic resetting operation, said weight being thereafter operative to transmit driving force to advance said maximum demand indicator, and a one-way pusher connection between said control member and said weight whereby the degree of movement imparted from said weight to said maximum demand indicator is dependent upon the degree of forward movement of said control member.

5. In a maximum demand electric meter, the combination of load responsive means comprising a control member adapted to move in a forward direction with rise in the load demand and to move in a reverse direction with fall in the load demand, a maximum demand indicator, resetting means for periodically resetting said maximum demand indicator, an energy storing weight movable between two vertically spaced positions, means operative by said resetting means in each periodic resetting operation for raising said weight to the upper of said positions, a one-way pusher connection between said weight and said maximum demand indicator whereby downward movement of said weight is operative to advance said maximum demand indicator, but whereby said weight is free to move upwardly without causing retractive movement of said maximum demand indicator, and a one-way pusher connection between said load responsive control member and said weight whereby said weight rises and falls with the forward and reverse movements of said control member but whereby said weight can be raised to its upper position in said resetting operation without causing reverse movement of said control member.

6. In a maximum demand electric meter, the combination of load responsive means comprising a control member adapted to move in a forward direction with rise in the load demand and to move in a reverse direction with fall in the load demand, a maximum demand indicator, resetting means for periodically resetting said maximum demand indicator, an energy storing weight arranged to be moved to a predetermined raised position by said resetting means in each periodic resetting operation, said weight transmitting driving force to advance said maximum demand indicator under the regulating control of said control member, a register for accumulating the maximum demands over a plurality of said periodic resetting operations, and means responsive to the actuation of said resetting means for advancing said register to a degree dependent upon the degree of resetting movement which said resetting means must impart to said maximum demand indicator to bring said indicator back to its zero position.

7. In a maximum demand electric meter, the combination of load responsive means comprising a control member adapted to move in a forward direction with rise in the load demand and to move in a reverse direction with fall in the load demand, a maximum demand indicator, resetting means for periodically resetting said maximum demand indicator, an energy storing weight, a one-way pusher connection between said resetting means and said weight whereby said weight is moved to a predetermined raised position by said resetting means in each periodic resetting operation, said weight being thereafter operative to transmit driving force to advance said maximum demand indicator, a one-way pusher connection between said control member and said weight whereby the degree of movement imparted from said weight to said maximum demand indicator is dependent upon the degree of forward movement of said control member, a register for accumulating the maximum demands over a plurality of said periodic resetting operations, and means responsive to the actuation of said resetting means for advancing said register to a degree dependent upon the degree of resetting movement which said resetting means must impart to said maximum demand indicator to bring said indicator back to its zero position.

8. In a maximum demand electric meter, the combination of load responsive means comprising a control member adapted to move in a forward direction with rise in the load demand and to move in a reverse direction with fall in the load demand, a maximum demand indicator, resetting means for periodically resetting said maximum demand indicator, an energy storing weight movable between two vertically spaced positions, means operative by said resetting means in each periodic resetting operation for raising said weight to the upper of said positions, a one-way pusher connection between said weight and said maximum demand indicator whereby downward movement of said weight is operative to advance said maximum demand indicator, but whereby said weight is free to move upwardly without causing retractive movement of said maximum demand indicator, a one-way pusher connection between said load responsive control member and said weight whereby said weight rises and falls with the forward and reverse movements of said control member but whereby said weight can be raised to its upper position in said resetting operation without causing reverse movement of said control member, a register for accumulating the maximum demands over a plurality of said periodic resetting operations, and means responsive to the actuation of said resetting means for advancing said register to a degree dependent upon the degree of resetting movement which said resetting means must impart to said maximum demand indicator to bring said indicator back to its zero position.

9. A maximum demand electric meter comprising in combination a pointer, motive means for driving said pointer, mechanism connecting said motive means in driving relation to said pointer, a shaft turned in one direction or the other by the rise or fall of the load demand, a member rigidly connected to said shaft, a second member driven by said motive means, means for connecting said motive means in driving relation to said second member, said first mentioned member being in the path of movement of said second member under the action of said motive means and abutting against said second member to limit its movement, whereby the said second member follows the first mentioned member and the driving of said pointer is controlled by the said shaft.

10. A maximum demand electric meter comprising in combination, a pointer, motive means for driving said pointer, mechanism connecting said motive means in driving relation to said pointer, a shaft turned in one direction or the other by the rise or fall of the load demand, a member rigidly connected to said shaft, a second member driven by said motive means, means for connecting said motive means in driving relation to said second member, said first mentioned member being in the path of movement of said second member under the action of said motive means and abutting against said second member to limit its movement whereby the said second member follows the first mentioned member and the driving of said pointer is controlled by the said shaft, a register for cumulating the maximum demands, means for resetting the pointer and means for driving said register by said resetting means in the resetting operation.

11. A maximum demand electric meter comprising in combination, a shaft, motive means for driving said shaft, mechanism connecting said motive means in driving relation to said shaft to drive in one direction only, a second shaft turned in one direction or the other by the rise or fall of the load demand, a member rigidly connected to said second shaft for limiting the movement of the first mentioned shaft under the action of said motive means, a second member connected in driving relation to said first mentioned shaft for limiting the movement of said first mentioned shaft, the first mentioned member being in the path of movement of said second member and abutting against said second member to limit its movement whereby the said second member follows the first mentioned member and the driving of the first mentioned shaft is controlled by the said second shaft, a resetting means for turning the first mentioned shaft in the opposite direction from that in which it is moved by the said motive means, a register for cumulating the maximum demands, means for driving the said register from the first mentioned shaft comprising a one-way clutch driving the said register when the first mentioned shaft is moved in the direction opposite to that in which it is turned by the said motive means and a resetting means for the first mentioned shaft driving the first mentioned shaft in the direction opposite to that in which it is driven by said motive means.

RET O. HAMILL.